US011820184B2

(12) United States Patent
Hirabayashi et al.

(10) Patent No.: US 11,820,184 B2
(45) Date of Patent: Nov. 21, 2023

(54) LAND-AND-AIR VEHICLE AND METHOD OF OPERATING LAND-AND-AIR VEHICLE

(71) Applicant: SUBARU CORPORATION, Tokyo (JP)

(72) Inventors: Daisuke Hirabayashi, Tokyo (JP); Keisuke Tajiri, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 259 days.

(21) Appl. No.: 16/936,016

(22) Filed: Jul. 22, 2020

(65) Prior Publication Data

US 2021/0094374 A1    Apr. 1, 2021

(30) Foreign Application Priority Data

Sep. 30, 2019   (JP) .................................. 2019-178809

(51) Int. Cl.
| | |
|---|---|
| *B60F 5/02* | (2006.01) |
| *B64C 37/00* | (2006.01) |
| *B64C 25/16* | (2006.01) |
| *B64C 25/58* | (2006.01) |
| *B60G 5/00* | (2006.01) |
| *B64C 29/00* | (2006.01) |

(52) U.S. Cl.
CPC ................ *B60F 5/02* (2013.01); *B60G 5/005* (2013.01); *B64C 25/16* (2013.01); *B64C 25/58* (2013.01); *B64C 29/0033* (2013.01); *B64C 37/00* (2013.01)

(58) Field of Classification Search
CPC ... B64C 25/16; B64C 25/58; B64C 2025/008; B64C 25/62; B64C 25/64; B62D 61/12; B62B 13/18
See application file for complete search history.

(56) References Cited

U.S. PATENT DOCUMENTS 2,457,625 A * 12/1948 Amiot ..................... B64C 25/16
49/248
2,511,362 A *  6/1950 Mercier .................... B64C 3/54
244/102 R (Continued)

FOREIGN PATENT DOCUMENTS

DE              723664 C   *  8/1942
DE              729222 C   * 12/1942

(Continued)

OTHER PUBLICATIONS

Translation of DE 723664 C, 08 1942 (Year: 1942).*

(Continued)

*Primary Examiner* — Joshua J Michener
*Assistant Examiner* — Ryan Andrew Yankey
(74) *Attorney, Agent, or Firm* — McDermott Will & Emery LLP

(57) ABSTRACT

A land-and-air vehicle configured to switch between a ground traveling mode and an aerial flight mode incudes a body, a wing, a wheel, a suspension, and a lock mechanism. The wing is attached to the body. The wheel is provided on a lower side of the body. The suspension is configured to support the body via the wheel on ground, and to contract due to self-weight of the land-and-air vehicle. The lock mechanism is configured to limit expansion of the suspension from a state in which the suspension has contracted due to the self-weight.

9 Claims, 10 Drawing Sheets

(56) References Cited

U.S. PATENT DOCUMENTS

| | | | | |
|---|---|---|---|---|
| 2,950,122 | A * | 8/1960 | Erickson | B60G 21/045 |
| | | | | 280/104 |
| 4,277,085 | A * | 7/1981 | Bryansky | B60G 21/04 |
| | | | | 280/124.125 |
| 5,050,817 | A * | 9/1991 | Miller | B60F 5/02 |
| | | | | 244/50 |
| 5,201,478 | A * | 4/1993 | Wooley | B64C 37/00 |
| | | | | 244/89 |
| 5,299,761 | A * | 4/1994 | Robin | B64C 25/20 |
| | | | | 244/102 R |
| 6,619,584 | B1 * | 9/2003 | Haynes | B64C 37/00 |
| | | | | 244/50 |
| 9,499,258 | B2 * | 11/2016 | Reynes | B64C 25/16 |
| 2001/0030408 | A1 * | 10/2001 | Miyoshi | B62K 25/28 |
| | | | | 267/141 |
| 2002/0117830 | A1 * | 8/2002 | Holt | B62K 25/28 |
| | | | | 280/283 |
| 2004/0217561 | A1 | 11/2004 | Kondo et al. | |
| 2005/0252330 | A1 * | 11/2005 | Denk | B62K 23/02 |
| | | | | 74/502.2 |
| 2009/0321560 | A1 | 12/2009 | Luce et al. | |
| 2017/0217586 | A1 | 8/2017 | Goelet | |
| 2018/0208298 | A1 | 7/2018 | Cottet et al. | |
| 2018/0244373 | A1 | 8/2018 | Mellor et al. | |
| 2019/0270513 | A1 | 9/2019 | Cottet et al. | |
| 2020/0031457 | A1 * | 1/2020 | Alley | B64C 25/60 |

FOREIGN PATENT DOCUMENTS

| | | | | |
|---|---|---|---|---|
| EP | 2634088 A1 * | 9/2013 | | B64C 25/16 |
| JP | 2004-268902 A | 9/2004 | | |
| JP | 2005-053434 A | 3/2005 | | |
| JP | 2010-018269 A | 1/2010 | | |
| JP | 2018-118720 A | 8/2018 | | |
| JP | 2018-172106 A | 11/2018 | | |

OTHER PUBLICATIONS

Office Action issued in corresponding Japanese Patent Application No. 2019-178809, dated Apr. 25, 2023, with English translation.

* cited by examiner

LAND-AND-AIR VEHICLE AND METHOD OF OPERATING LAND-AND-AIR VEHICLE

CROSS-REFERENCE TO RELATED APPLICATIONS

The present application claims priority from Japanese Patent Application No. 2019-178809 filed on Sep. 30, 2019, the entire contents of which are hereby incorporated by reference.

BACKGROUND

The technology relates to a land-and-air vehicle and a method of operating the land-and-air vehicle.

A landing device generally provided in an aircraft causes air resistance on the aircraft to increase during aerial flight. Accommodating the landing device in a fuselage makes it possible to reduce an increase in air resistance during aerial flight. Japanese Unexamined Patent Application Publication No. 2018-118720 discloses, as a landing device accommodatable in a fuselage of an aircraft, a landing device including a shortening mechanism that shortens a total length of the landing device.

SUMMARY

An aspect of the technology provides a land-and-air vehicle configured to switch between a ground traveling mode and an aerial flight mode. The land-and-air vehicle incudes a body, a wing, a wheel, a suspension, and a lock mechanism. The wing is attached to the body. The wheel is provided on a lower side of the body. The suspension is configured to support the body via the wheel on ground, and to contract due to self-weight of the land-and-air vehicle. The lock mechanism is configured to limit expansion of the suspension from a state in which the suspension has contracted due to the self-weight.

An aspect of the technology provides a method of operating a land-and-air vehicle configured to switch between a ground traveling mode and an aerial flight mode. The land-and-air vehicle incudes a body, a wing, a wheel, a suspension, and a lock mechanism. The wing is attached to the body. The wheel is provided on a lower side of the body. The suspension is configured to support the body via the wheel on ground, and to contract due to self-weight of the land-and-air vehicle. The lock mechanism is configured to limit expansion of the suspension from a state in which the suspension has contracted due to the self-weight. The method includes: limiting the expansion of the suspension by putting the lock mechanism into a lock state before takeoff of the land-and-air vehicle; and allowing the expansion of the suspension by putting the lock mechanism into an unlock state before landing of the land-and-air vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overall Configuration and Operation Mode of Land-and-Air Vehicle

Figure 1:
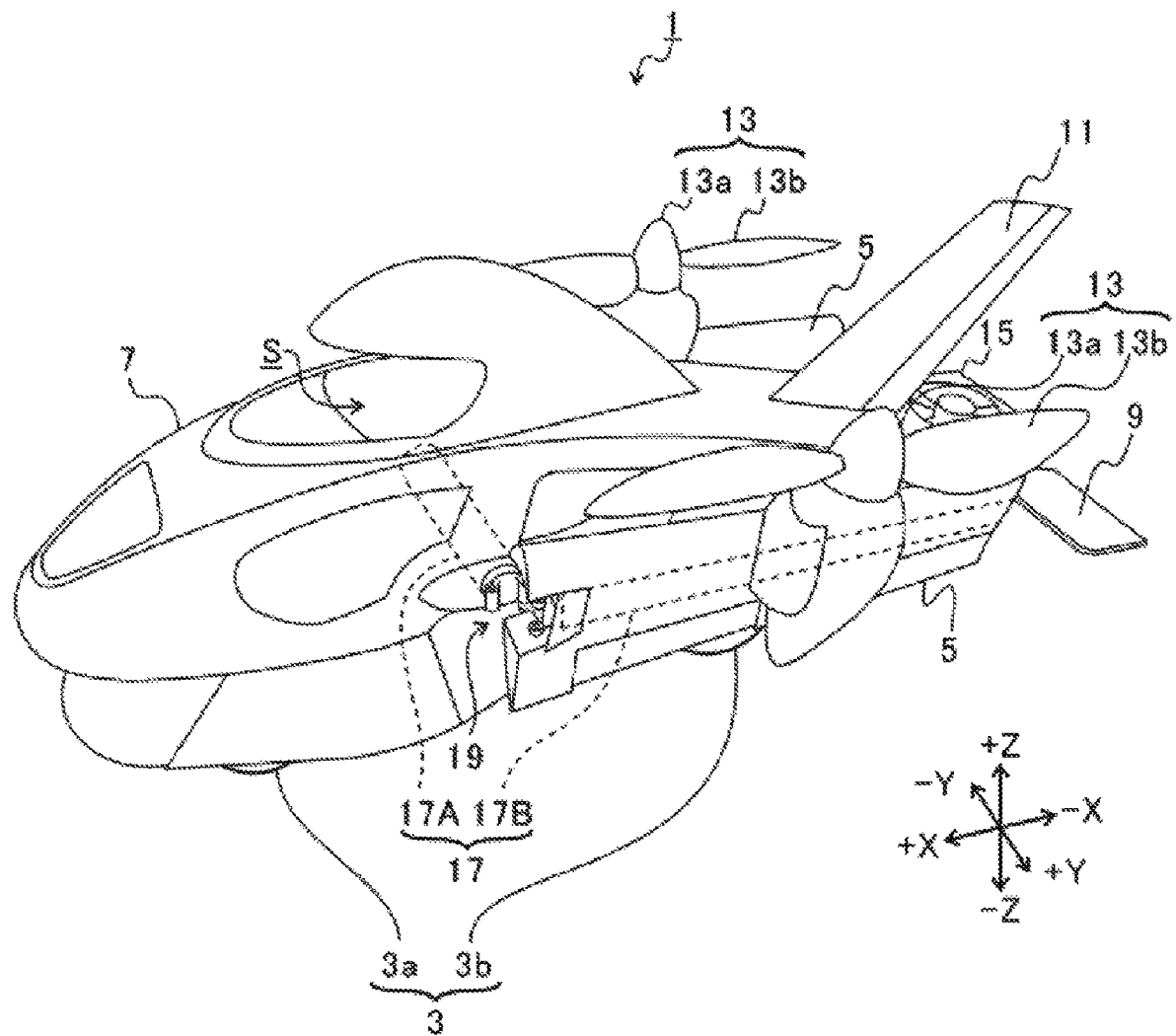
FIG. 1 is a schematic perspective view of a land-and-air vehicle in a ground traveling mode according to one example embodiment of the technology.
Figure 2:
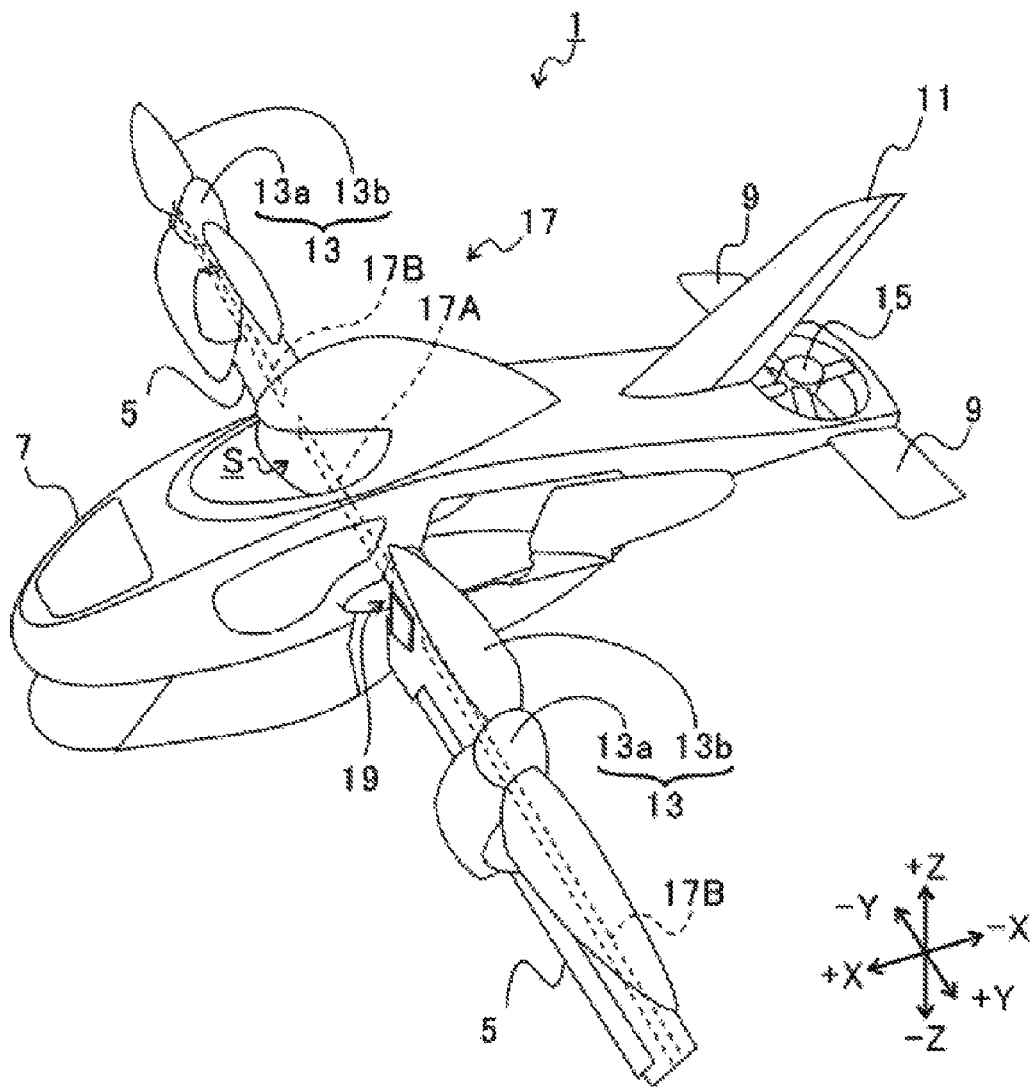
FIG. 2 is a schematic perspective view of the land-and-air vehicle in a vertical takeoff-and-landing mode according to the example embodiment.
Figure 3:
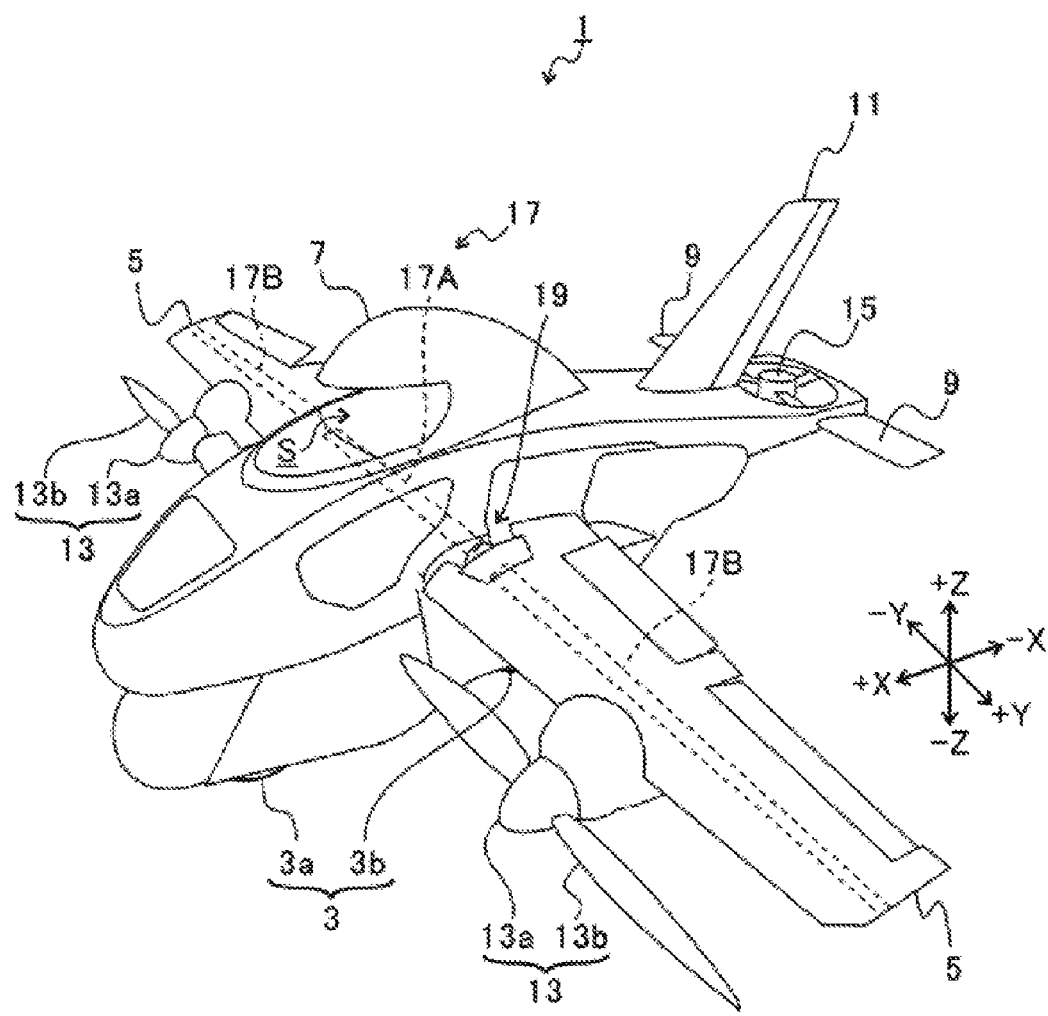
FIG. 3 is a schematic perspective view of the land-and-air vehicle in a horizontal flight mode according to the example embodiment.

First, with reference to FIG. 1 to FIG. 3, description will be given on an overall configuration and an operation mode of a land-and-air vehicle 1 according to an example embodiment of the technology. FIG. 1 is a schematic perspective view of the land-and-air vehicle 1 in a ground traveling mode. FIG. 2 is a schematic perspective view of the land-and-air vehicle 1 in a vertical takeoff-and-landing mode. FIG. 3 is a schematic perspective view of the land-and-air vehicle 1 in a horizontal flight mode.

In the following description, a direction parallel to a direction of travel of the land-and-air vehicle 1 may be referred to as a longitudinal direction X (or "roll-axis direction" in some cases). A horizontal direction perpendicular to the longitudinal direction X may be referred to as a lateral direction Y (or "pitch-axis direction" in some cases). A direction perpendicular to the longitudinal direction X and the lateral direction Y may be referred to as a vertical direction Z (or "yaw-axis direction" in some cases). The longitudinal direction X may include a forward direction +X and a rearward direction −X. The forward direction +X may refer to a direction toward the front side of a fuselage (a forward direction of travel of the land-and-air vehicle 1). The rearward direction −X may refer to a direction toward the rear side of the fuselage (a rearward direction of travel of the land-and-air vehicle 1). The lateral direction Y may include a leftward direction +Y and a rightward direction −Y respectively referring to directions toward the left side and the right side of the fuselage. The vertical direction Z may include an upward direction +Z and a downward direction −Z respectively referring to directions toward the upper side and the lower side of the fuselage.

As illustrated in FIG. 1 to FIG. 3, the land-and-air vehicle 1 according to the example embodiment (hereinafter simply referred to as "vehicle 1") may have the form of a motorcycle, for example, including one front wheel 3 and one rear wheel 3, i.e., two wheels 3. The vehicle 1 may further include a left and right pair of main wings 5. The vehicle 1 is configured to switch between the ground traveling mode and an aerial flight mode. Including travel units, e.g., the two wheels 3, enables the vehicle 1 to travel on the ground, as with an ordinary motorcycle, in the ground traveling mode. Including flight units, e.g., the main wings 5, enables the vehicle 1 to fly in the air, as with an aircraft, in the aerial flight mode. In one embodiment, the main wings 5 may serve as a "wing".

The vehicle 1 may include the wheels 3, the main wings 5, a body 7, horizontal tails 9, a vertical tail 11, first rotary wings 13, a second rotary wing 15, a main wing spar 17, and hinge mechanisms 19. The vehicle 1 may be configured to switch the operation mode by changing an arrangement of the main wings 5, as illustrated in FIGS. 1 to 3. In the example embodiment, the operation mode may include the ground traveling mode (FIG. 1) and the aerial flight mode. The aerial flight mode may include the vertical takeoff-and-landing mode (FIG. 2) and the horizontal flight mode (FIG. 3). The vehicle 1 may be configured to switch between the vertical takeoff-and-landing mode and the horizontal flight mode during flight.

In the ground traveling mode illustrated in FIG. 1, the vehicle 1 may be in a main wing folded state in which the two main wings 5 are folded in the rearward direction −X with respect to the body 7. Folding the two main wings 5 makes a width of the vehicle 1 in the lateral direction Y smaller. This reduces air resistance on the vehicle 1 during ground traveling, and also enables the vehicle 1 to travel even in an environment with limitations on vehicle width.

In the vertical takeoff-and-landing mode illustrated in FIG. 2, the vehicle 1 may be in a main wing deployed state in which the two main wings 5 are deployed in the leftward direction +Y and the rightward direction −Y with respect to the body 7. The respective hinge mechanisms 19 disposed at bases of the two main wings 5 may cause the two main wings 5 to pivot about a pivot axis extending in the vertical direction Z. This causes the vehicle 1 to switch from the main wing folded state illustrated in FIG. 1 to the main wing deployed state illustrated in FIG. 2. In the vertical takeoff-and-landing mode, the two main wings 5 may be disposed substantially in a YZ plane, and rotating shafts of the two first rotary wings 13 may be disposed substantially in the vertical direction Z. In this state, rotation of the first rotary wings 13 enables thrust (lift) to be produced in the upward direction +Z of the vehicle 1. Increasing or decreasing the thrust in the upward direction +Z enables the vehicle 1 to ascend in the upward direction +Z from the ground to take off, or to descend in the downward direction −Z from the air to land. The vehicle 1 is thus able to operate as an air vehicle configured to execute vertical takeoff and landing.

In the horizontal flight mode illustrated in FIG. 3, the vehicle 1 may be in the main wing deployed state, as with the vertical takeoff-and-landing mode. In the horizontal flight mode, the two main wings 5 and the two first rotary wings 13 may transition from a state in the vertical takeoff-and-landing mode to a state of having pivoted forward by 90 degrees about the main wing spar 17. Thus, the two main wings 5 may be disposed substantially in a XY plane, and the rotating shafts of the two first rotary wings 13 may be disposed substantially in the longitudinal direction X. As described above, causing the main wing spar 17 to pivot about a pivot axis extending in the lateral direction Y enables the vehicle 1 to switch between the vertical takeoff-and-landing mode illustrated in FIG. 2 and the horizontal flight mode illustrated in FIG. 3. In the horizontal flight mode, rotation of the first rotary wings 13 enables thrust to be produced in the forward direction +X of the vehicle 1. Increasing or decreasing the thrust in the forward direction +X enables the vehicle 1 to increase or decrease a speed of movement in the forward direction +X (i.e., a flying speed).

2. Components of Vehicle

Next, components of the vehicle 1 according to the example embodiment will be described in detail.

As described above, the vehicle 1 according to the example embodiment may be an air vehicle based on a motorcycle. The vehicle 1 may therefore include the two wheels 3 (a front wheel 3a and a rear wheel 3b) as drive wheels that come into contact with the ground (e.g., a road or a paved way) during ground traveling. The front wheel 3a may be provided on the front side of a lower part of the body 7. The rear wheel 3b may be provided on the rear side of the lower part of the body 7. In the ground traveling mode illustrated in FIG. 1, the wheels 3 may be rotationally driven while being pressed against the ground, causing the vehicle 1 to travel.

The two main wings 5 may be provided on the respective left and right sides substantially in the middle of the body 7. The two main wings 5 may be disposed in a middle part of the body 7 in the longitudinal direction X to be coupled to the left and right sides of the body 7. In the horizontal flight mode illustrated in FIG. 3, the two main wings 5 may be deployed to the left and right sides of the body 7, producing lift in the upward direction +Z for the vehicle 1.

The body 7 may be a main structural member of the fuselage of the vehicle 1. In the example embodiment, the body 7 may have a streamlined shape in which a length in the longitudinal direction X is longer than a length in the lateral direction Y. The interior of the body 7 may include occupant space S and various devices. The occupant space S may allow an operator (or another occupant) to be on board. The various devices may include a driving source such as an engine, a fuel tank, a driving device, and a measuring instrument. In the example embodiment, the body 7 may configure a cover that covers almost the whole internal structure of the vehicle 1, including the occupant space S, the various devices, and the wheels 3. However, without being limited to this example, the occupant space S or the various devices inside the body 7 may partially be exposed to the outside, without being covered by the body 7.

The two horizontal tails 9 may be provided on the respective left and right sides substantially at a rear end of the body 7. The two horizontal tails 9 may be disposed to stick out in the lateral direction Y from the rear end of the body 7. The two horizontal tails 9 may be configured to keep pitch-axis (Y-axis in FIG. 1 to FIG. 3) stability of the vehicle 1.

The vertical tail 11 may be provided on the upper side substantially at the rear end of the body 7. The vertical tail 11 may be disposed to stick out in the upward direction +Z from the rear end of the body 7. The vertical tail 11 may be configured to keep yaw-axis (Z-axis in FIG. 1 to FIG. 3) stability of the vehicle 1.

The two first rotary wings 13 may be provided on the respective two main wings 5. Each of the first rotary wings 13 may include a spinner 13a and a plurality of blades 13b. The spinner 13a may be coupled to an unillustrated motor via a shaft. The blades 13b may be radially disposed around the spinner 13a. The first rotary wings 13 may be rotated to produce thrust (lift) in the upward direction +Z in the vertical takeoff-and-landing mode illustrated in FIG. 2, and to produce thrust in the forward direction +X in the horizontal flight mode illustrated in FIG. 3.

The second rotary wing 15 may be provided between the two horizontal tails 9 at the rear end of the body 7. The second rotary wing 15 may be rotated to produce thrust in the vertical direction Z, thereby controlling a pitch-axis attitude of the vehicle 1. The second rotary wing 15 makes it possible to stabilize an attitude during hovering of the vehicle 1.

The main wing spar 17 may be configured to support the two main wings 5. The main wing spar 17 may be provided astride the left and right pair of main wings 5 and the body 7 to extend in the lateral direction Y. The main wing spar 17 may be disposed to penetrate the body 7 in the lateral direction Y. In the example embodiment, the main wing spar 17 may be divided into three parts, including a main wing spar middle part 17A, a main wing spar left part 17B, and a main wing spar right part 17B. The main wing spar middle part 17A may be disposed inside the body 7. The main wing spar left part 17B and the main wing spar right part 17B may be disposed inside the left and right pair of main wings 5. The main wing spar middle part 17A, the main wing spar left part 17B, and the main wing spar right part 17B included in the main wing spar 17 may be coupled together by the hinge mechanisms 19.

The main wing spar 17 may be configured to pivot about the pivot axis extending in the lateral direction Y. This makes it possible to adjust a tilt of the main wings 5 with respect to a horizontal direction, enabling the vehicle 1 to serve as a tilt-wing air vehicle. In other words, causing the main wing spar 17 to pivot to cause the two main wings 5 to pivot enables the vehicle 1 to switch between the state in the vertical takeoff-and-landing mode (FIG. 2) and the state in the horizontal flight mode (FIG. 3). This enables the vehicle 1 to perform vertical takeoff and landing as well as horizontal flight. In the example embodiment, the whole main wing spar 17 may have a cylindrical shape for smooth pivot operation of the main wing spar 17.

The left and right pair of hinge mechanisms 19 may be provided at midpoints of the main wing spar 17. The two hinge mechanisms 19 may be disposed on the left and right sides of the body 7. The left hinge mechanism 19 may bendably couple the main wing spar left part 17B inside the left main wing 5 to the main wing spar middle part 17A inside the body 7. The right hinge mechanism 19 may bendably couple the main wing spar right part 17B inside the right main wing 5 to the main wing spar middle part 17A inside the body 7. The two main wings 5 may thus be supported to be foldable with respect to the body 7 by the hinge mechanisms 19. In the ground traveling mode (FIG. 1), the main wing spar left part 17B and the main wing spar right part 17B may be bent with respect to the main wing spar middle part 17A, which enables the two main wings 5 to be folded with respect to the body 7. In the vertical takeoff-and-landing mode (FIG. 2) and the horizontal flight mode (FIG. 3), the main wing spar middle part 17A, the main wing spar left part 17B, and the main wing spar right part 17B of the main wing spar 17 may be straightly coupled together to extend in the lateral direction Y, which enables the two main wings 5 to be deployed with respect to the body 7.

3. Configuration of Power System of Vehicle

Figure 4:
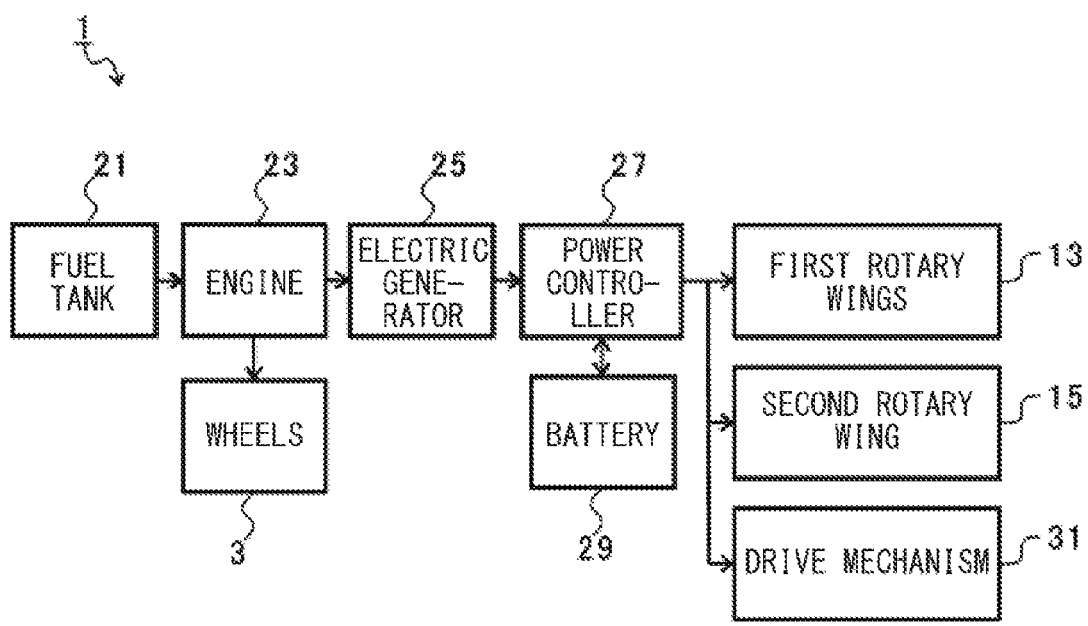
FIG. 4 is a block diagram illustrating a configuration of a power system of the land-and-air vehicle according to the example embodiment.

Next, with reference to FIG. 4, a configuration of a power system of the vehicle 1 will be described. FIG. 4 is a block diagram illustrating the configuration of the power system of the vehicle 1. As illustrated in FIG. 4, the vehicle 1 may include a fuel tank 21, an engine 23, an electric generator 25, a power controller 27, a battery 29, and a drive mechanism 31.

The fuel tank 21 may store fuel. The engine 23 may be supplied with the fuel stored in the fuel tank 21. The engine 23 may burn the fuel in a combustion chamber, and use a pressure resulting from the combustion to cause a piston to reciprocate, thereby rotating a crankshaft. Rotation of the crankshaft may be transmitted to the wheels 3 via an unillustrated power transmission mechanism. The wheels 3 may thus rotate, which enables the land-and-air vehicle 1 to travel on the ground.

The crankshaft may be coupled to the electric generator 25. Rotation of the crankshaft may be transmitted to the electric generator 25. The electric generator 25 may be driven by the rotation of the crankshaft to generate electric power. The power controller 27 may charge the battery 29 with the electric power generated by the electric generator 25. The power controller 27 may supply electric power from the battery 29 to the first rotary wings 13, the second rotary wing 15, and the drive mechanism 31. The power controller 27 may also control an amount of the electric power to be supplied to the first rotary wings 13, the second rotary wing 15, and the drive mechanism 31. The first rotary wings 13, the second rotary wing 15, and the drive mechanism 31 may be driven by the electric power supplied from the power controller 27.

The drive mechanism 31 may include a flange and an actuator. The flange may be coupled to the main wing spar 17. The actuator may be coupled to the flange. The drive mechanism 31 may drive the actuator to cause the main wing spar 17 to pivot via the flange. Causing the main wing spar 17 to pivot enables the drive mechanism 31 to switch the two main wings 5 between the state in the vertical takeoff-and-landing mode (FIG. 2) and the state in the horizontal flight mode (FIG. 3).

4. Configuration of Landing Device

Figure 5:
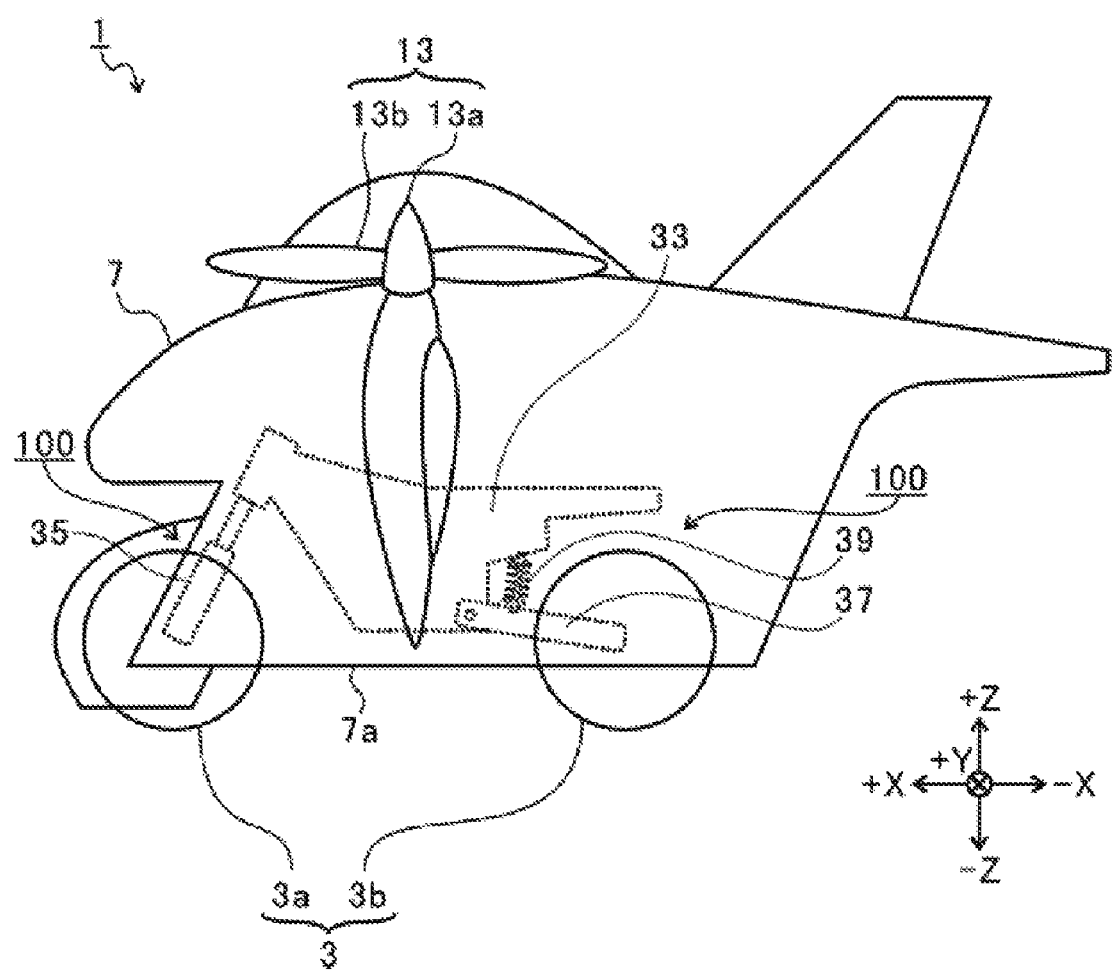
FIG. 5 is a schematic view of an internal structure of the land-and-air vehicle according to the example embodiment.

Next, with reference to FIG. 5, a configuration of a landing device 100 of the vehicle 1 will be described. FIG. 5 is a schematic view of the internal structure of the vehicle 1. As illustrated in FIG. 5, the interior of the body 7 may accommodate a body frame 33, a front suspension 35, a swing arm 37, and a rear suspension 39. The body frame 33 may be configured integrally with the body 7 to serve as a portion of the body 7.

The body frame 33 may configure a frame structure of the vehicle 1. The body frame 33 may be supported on the ground via the front suspension 35 on the front wheel 3a side, and via the swing arm 37 and the rear suspension 39 on the rear wheel 3b side.

The front suspension 35 may have one end coupled to the body frame 33 and the other end coupled to the front wheel 3a. The front suspension 35 may be expandable and contractible between the body frame 33 and the front wheel 3a. The front suspension 35 may support, at the other end, the front wheel 3a rotatably and elastically.

The swing arm 37 may have one end coupled to the body frame 33 and the other end coupled to the rear wheel 3b. The swing arm 37 may be supported to be pivotable (swingable) with respect to the body frame 33 to support the rear wheel 3b rotatably. The rear suspension 39 may have one end coupled to the body frame 33 and the other end coupled to the swing arm 37. The rear suspension 39 may be expandable and contractible between the body frame 33 and the swing arm 37. The rear suspension 39 may support, at the other end, the swing arm 37 and the rear wheel 3b elastically.

The front suspension 35 and the rear suspension 39 may reduce impact (vibration) transmitted from the ground to the body frame 33. Hereinafter, these suspensions 35 and 39 may be collectively and simply referred to as "suspensions" in some cases. For example, at the time of landing of the vehicle 1, the suspensions 35 and 39 may reduce impact transmitted from the ground to the body frame 33 via the wheels 3. In the example embodiment, the wheels 3 (the front wheel 3a and the rear wheel 3b), the front suspension 35, the swing arm 37, and the rear suspension 39 may thus serve as the landing device 100. The landing device 100 makes it possible to reduce impact applied to the vehicle 1 at the time of landing, and also to support the fuselage of the vehicle 1 on the ground after landing.

The suspensions 35 and 39 may bias the wheels 3 (the front wheel 3a and the rear wheel 3b) in a direction away from the body frame 33. Biasing force of the suspensions 35 and 39 may cause the wheels 3 to protrude downward from a bottom surface 7a of the body 7. During ground traveling of the vehicle 1, the wheels 3 may thus sufficiently protrude below the body 7, which enables the suspensions 35 and 39 to absorb vibration and impact caused by traveling. This results in stable traveling. During aerial flight of the vehicle 1, air resistance on the vehicle 1 can increase with an increase in amount of protrusion by which the wheels 3 protrude downward from the bottom surface 7a. This can cause fuel economy of the vehicle 1 to deteriorate.

Figure 6:
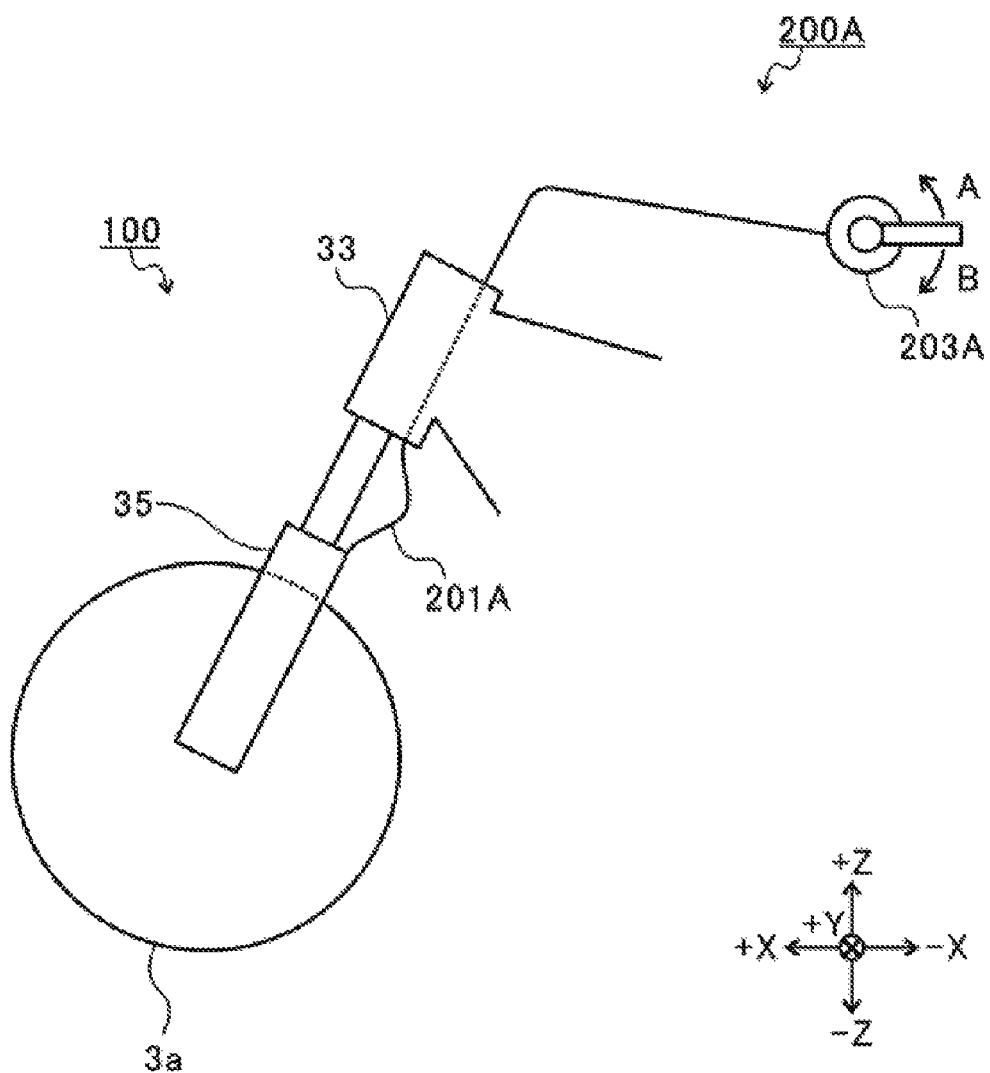
FIG. 6 is a schematic view of a lock mechanism provided on a front wheel side of the land-and-air vehicle according to the example embodiment.
Figure 7:
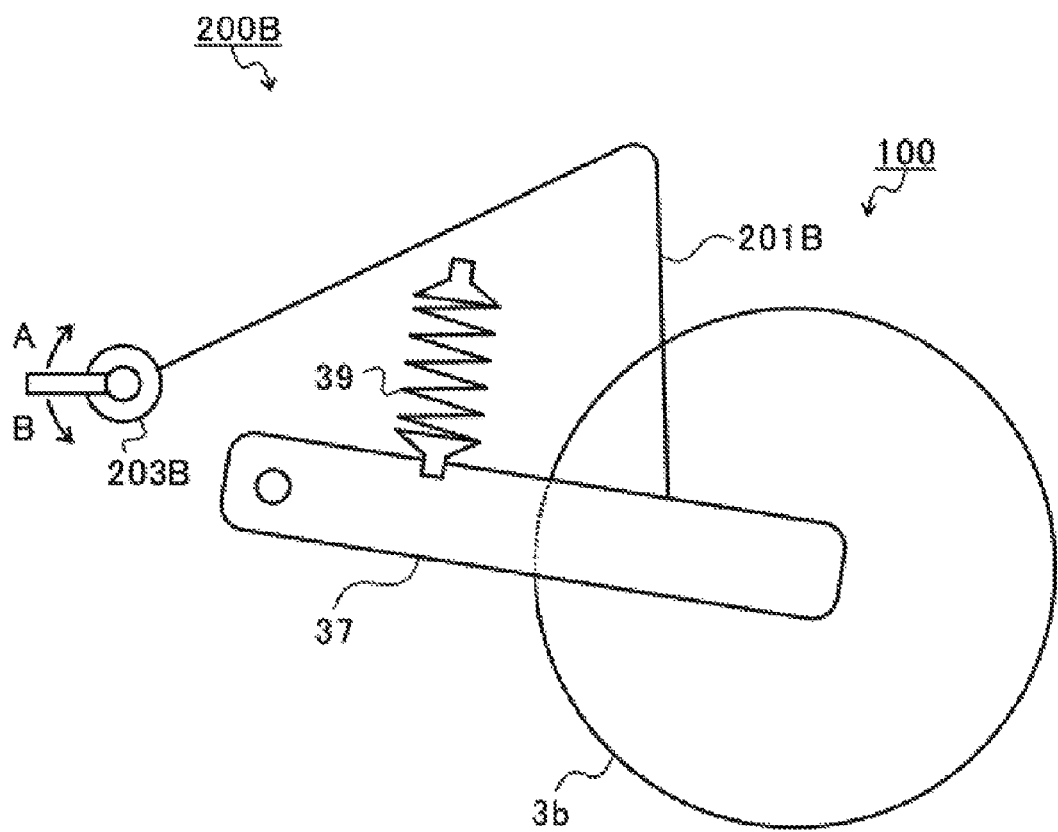
FIG. 7 is a schematic view of a lock mechanism provided on a rear wheel side of the land-and-air vehicle according to the example embodiment.

Hence, the vehicle 1 according to the example embodiment includes lock mechanisms 200A and 200B configured to limit expansion of the suspensions 35 and 39. FIG. 6 is a schematic view of the lock mechanism 200A on the front wheel 3a side of the vehicle 1 according to the example embodiment. FIG. 7 is a schematic view of the lock mechanism 200B on the rear wheel 3b side of the vehicle 1 according to the example embodiment.

As illustrated in FIG. 6, the lock mechanism 200A on the front wheel 3a side may include a wire 201A and a lever member 203A. The wire 201A may include an outer casing and an inner wire inserted into the outer casing. The inner wire may be able to slide within the outer casing, while being guided by the outer casing. The wire (inner wire) 201A may have one end coupled to the front suspension 35 and the other end coupled to the lever member 203A.

The lever member 203A may be configured to pivot about a pivot axis. The lever member 203A may be operable in an arrow A direction or an arrow B direction indicated in FIG. 6 by an occupant (in the example embodiment, the operator) on board on the vehicle 1. Pivoting of the lever member 203A may cause the wire 201A to be reeled or unreeled. For example, if the lever member 203A pivots in the arrow A direction indicated in FIG. 6, the wire 201A may be unreeled to loosen as illustrated in FIG. 6. If the lever member 203A pivots in the arrow B direction indicated in FIG. 6, the wire 201A may be reeled to tighten. The wire 201A may be reeled or unreeled manually by using the lever member 203A as a handle, or automatically by installing an electric motor, for example, and using the lever member 203A as a switch.

Being reeled, the wire 201A may limit movement of the front suspension 35 in the downward direction −Z. If the movement in the downward direction −Z is limited with the front suspension 35 having contracted, tension against the front suspension 35 trying to expand may be applied to the wire 201A. In addition, limiting the movement of the front suspension 35 in the downward direction −Z may limit movement of the front wheel 3a in the downward direction −Z. In other words, if the lever member 203A is caused to pivot in the arrow B direction indicated in FIG. 6, the lock mechanism 200A may limit the expansion of the front suspension 35 to lock the front suspension 35 in a contraction position. The lock mechanism 200A may additionally include an unillustrated regulating member configured to regulate pivoting of the lever member 203A. The regulating member may be operable by the operator on board on the vehicle 1. The regulating member may regulate pivoting of the lever member 203A, which makes it possible to keep the lock mechanism 200A in a lock state of limiting the expansion of the front suspension 35.

Conversely, if regulation by the regulating member is canceled, and the lever member 203A is caused to pivot in the arrow A direction indicated in FIG. 6, the lock mechanism 200A may enter an unlock state. The lock mechanism 200A may thus unlock and release the front suspension 35, allowing the expansion of the front suspension 35.

As illustrated in FIG. 7, the lock mechanism 200B on the rear wheel 3b side may include a wire 201B and a lever member 203B. The wire 201B may include an outer casing and an inner wire inserted into the outer casing. The inner wire may be able to slide within the outer casing, while being guided by the outer casing. The wire (inner wire) 201B may have one end coupled to the swing arm 37 and the other end coupled to the lever member 203B.

The lever member 203B may be configured to pivot about a pivot axis. The lever member 203A may be operable in an arrow A direction or an arrow B direction indicated in FIG. 7 by the operator on board on the vehicle 1. Pivoting of the lever member 203B may cause the wire 201B to be reeled or unreeled. For example, if the lever member 203B pivots in the arrow A direction indicated in FIG. 7, the wire 201B may be unreeled to loosen. If the lever member 203B pivots in the arrow B direction indicated in FIG. 7, the wire 201B may be reeled to tighten. As with the front wheel 3a side, the wire 201B may be reeled or unreeled manually by using the lever member 203B as a handle, or automatically by installing an electric motor, for example, and using the lever member 203B as a switch. In a case of unreeling or reeling the wire 201B automatically, the lever members 203A and 203B on the front wheel 3a side and the rear wheel 3b side may be integrated, which enables one lever member to perform reeling, for example, of the wires 201A and 201B.

Being reeled, the wire 201B may limit movement of the swing arm 37 and the rear suspension 39 in the downward direction −Z. If the movement in the downward direction −Z is limited with the rear suspension 39 having contracted, tension against the rear suspension 39 trying to expand may be applied to the wire 201B. In addition, limiting the movement of the swing arm 37 in the downward direction −Z may limit movement of the rear suspension 39 and the rear wheel 3b in the downward direction −Z. In other words, if the lever member 203B is caused to pivot in the arrow B direction indicated in FIG. 7, the lock mechanism 200B may limit the expansion of the rear suspension 39 to lock the rear suspension 39 in a contraction position. The lock mechanism 200B may additionally include an unillustrated regulating member configured to regulate pivoting of the lever member 203B. The regulating member may be operable by the operator on board on the vehicle 1. The regulating member may regulate pivoting of the lever member 203B, which makes it possible to keep the lock mechanism 200B in a lock state of limiting the expansion of the rear suspension 39.

Conversely, if regulation by the regulating member is canceled, and the lever member 203B is caused to pivot in the arrow A direction indicated in FIG. 7, the lock mechanism 200B may enter an unlock state. The lock mechanism 200B may thus unlock and release the rear suspension 39, allowing the expansion of the rear suspension 39.

In a state in which the vehicle 1 is present on the ground, the wheels 3 and the suspensions 35 and 39 may support the vehicle 1 on the ground. In this state, the suspensions 35 and 39 may contract due to self-weight of the vehicle 1, and may further contract, if an occupant is present, by an amount corresponding to a body weight of the occupant.

Figure 8:
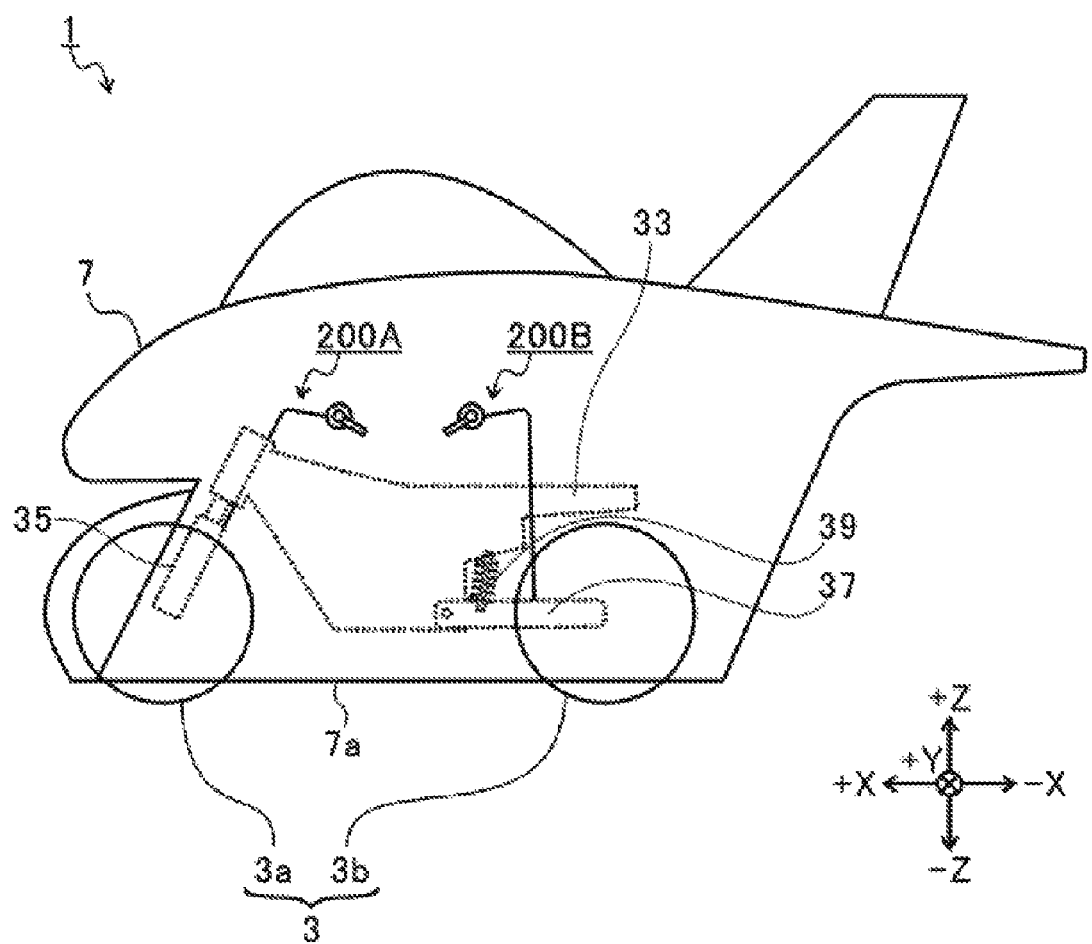
FIG. 8 is a schematic view of the land-and-air vehicle according to the example embodiment, illustrating a state in which a suspension has contracted due to self-weight.

FIG. 8 is a schematic view of the vehicle 1 according to the example embodiment, illustrating a state in which the suspensions 35 and 39 have contracted due to the self-weight. For easy understanding of the drawing, FIG. 8 does not illustrate the first rotary wings 13. As illustrated in FIG. 8, in a state in which the suspensions 35 and 39 have contracted due to the self-weight of the vehicle 1, the lock mechanisms 200A and 200B may limit the expansion of the suspensions 35 and 39 to lock the suspensions 35 and 39 in the respective contraction positions. If an occupant is present, the self-weight of the vehicle 1 may additionally include a body weight of the occupant.

Figure 9:
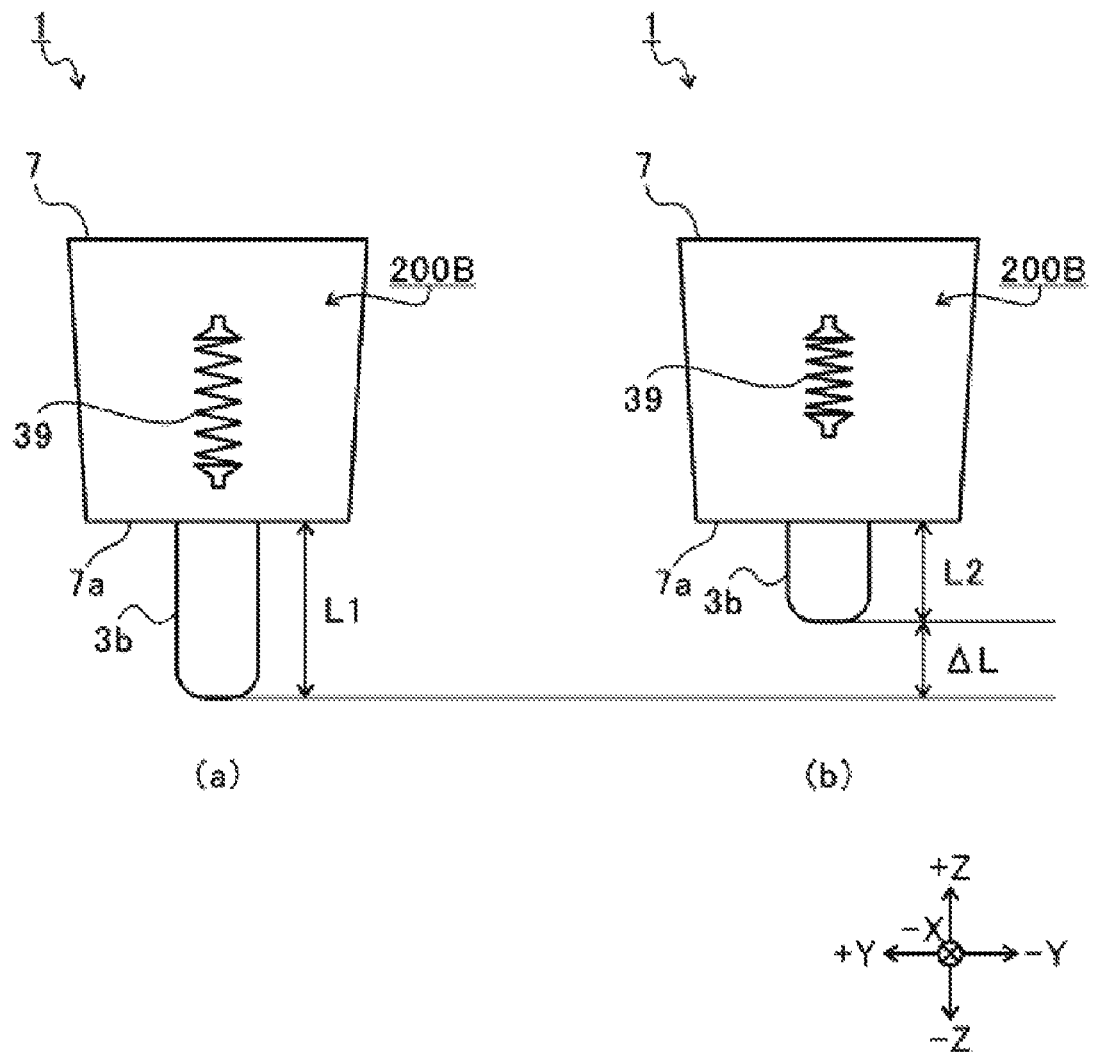
FIG. 9 is a schematic view of the land-and-air vehicle according to the example embodiment, illustrating cases where the lock mechanism is in a lock state and an unlock state.

FIG. 9 is a schematic view of the vehicle 1 according to the example embodiment, illustrating cases where the lock mechanism 200B is in the lock state and the unlock state. FIG. 9 illustrates a relationship between the body 7, the rear wheel 3b, and the rear suspension 39; a relationship between the body 7, the front wheel 3a, and the front suspension 35 may be similar to that illustrated in FIG. 9. In FIG. 9, (a) illustrates a state before landing of the vehicle 1, where the lock mechanism 200B is in the unlock state, and (b) illustrates a state before takeoff of the vehicle 1, where the lock mechanism 200B is in the lock state.

A takeoff time may refer to a time when the wheels 3 of the vehicle 1 that is ready for takeoff leaves the ground. Before takeoff may refer to any time in a period between a time when the vehicle 1 present on the ground gets ready to take off and a predetermined amount of time before the takeoff time. The predetermined amount of time may be, for example, several seconds to several tens of seconds. After takeoff may refer to any time after the takeoff time. The time when the vehicle 1 present on the ground gets ready to take off may be, for example, a time when the operation mode of the vehicle 1 switches from the ground traveling mode (FIG. 1) to the vertical takeoff-and-landing mode (FIG. 2), or may be a time when rotation of the first rotary wings 13 is started for takeoff.

A landing time may refer to a time when the wheels 3 of the vehicle 1 that is ready for landing comes into contact with the ground. Before landing may refer to any time in a period between a time when the vehicle 1 flying gets ready to land and a predetermined amount of time before the landing time. The predetermined amount of time may be, for example, several seconds to several tens of seconds. After landing may refer to any time after the landing time. The time when the vehicle 1 flying gets ready to land may be, for example, a time when the operation mode of the vehicle 1 switches from the horizontal flight mode (FIG. 3) to the vertical takeoff-and-landing mode (FIG. 2), or may be a time when a descent is started for landing.

As illustrated in (a) of FIG. 9, before landing, the lock mechanism 200B may be put into the unlock state, allowing the expansion of the rear suspension 39 from the contraction position. Thus, force of the rear suspension 39 expanding may cause the rear wheel 3b to protrude downward from the bottom surface 7a of the body 7. An amount of protrusion L of the rear wheel 3b from the bottom surface 7a at this time may be denoted with L1.

As illustrated in (b) of FIG. 9, before takeoff, the rear suspension 39 may be in a state of having contracted due to the self-weight of the vehicle 1. The contraction of the rear suspension 39 may cause the rear wheel 3b to be raised in the upward direction +Z (contraction direction) with respect to the body frame 33. In this state, the lock mechanism 200B may be put into the lock state, limiting the expansion of the rear suspension 39 in the downward direction −Z (expansion direction). The amount of protrusion L of the rear wheel 3b from the bottom surface 7a at this time may be denoted with L2. The amount of protrusion L2 when the rear suspension 39 is locked may be smaller, by a difference ΔL, than the amount of protrusion L1 when the rear suspension 39 is unlocked.

The unillustrated regulating member, for example, of the lock mechanism 200B may regulate pivoting of the lever member 203B. This causes the lock mechanism 200B to limit the expansion of the rear suspension 39 in the downward direction −Z (expansion direction) even after takeoff of the vehicle 1. The amount of protrusion L of the rear wheel 3b from the bottom surface 7a may thus be kept at the amount of protrusion L2.

As described above, the lock mechanism 200B may lock the rear suspension 39 in the contraction position to reduce, from L1 to L2, the amount of protrusion L of the rear wheel 3b from the bottom surface 7a after takeoff and during aerial flight.

5. Configuration of Wheel Covering Mechanism

In the example embodiment, openings may be provided on the lower side of the body 7 to allow the wheels 3 to protrude downward therethrough. Thus, portions, e.g., lower parts, of the wheels 3 may protrude downward from the bottom surface 7a of the body 7 even during aerial flight of the vehicle 1, keeping a state of being exposed to the outside. Even partial protrusion (exposure) of the wheels 3 from the body 7 may cause discontinuities of the streamlined shape in a cross section of the body 7, causing an increase in air resistance on the vehicle 1. Hence, in the example embodiment, fairings that cover protruding portions of the wheels 3 may be provided to reduce an increase in air resistance due to protrusion of the wheels 3.

Figure 10A:
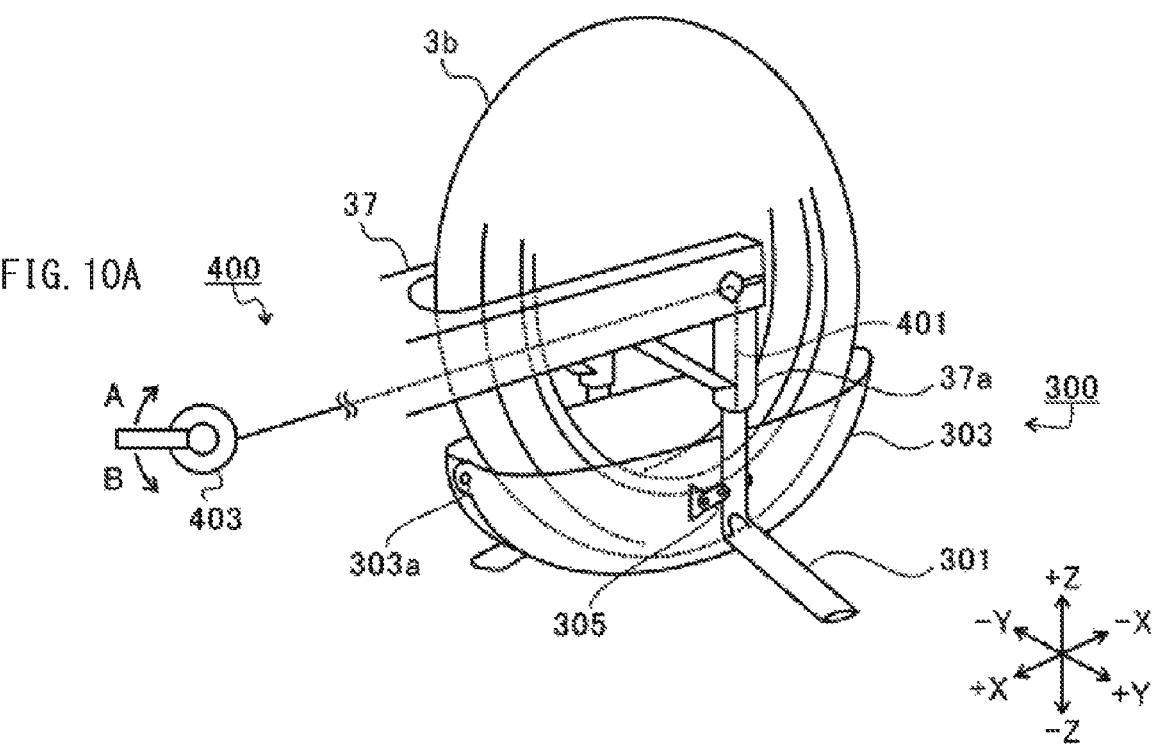
FIGS. 10A and 10B are schematic views of a configuration of a wheel covering mechanism provided in the land-and-air vehicle according to the example embodiment.
Figure 10B:
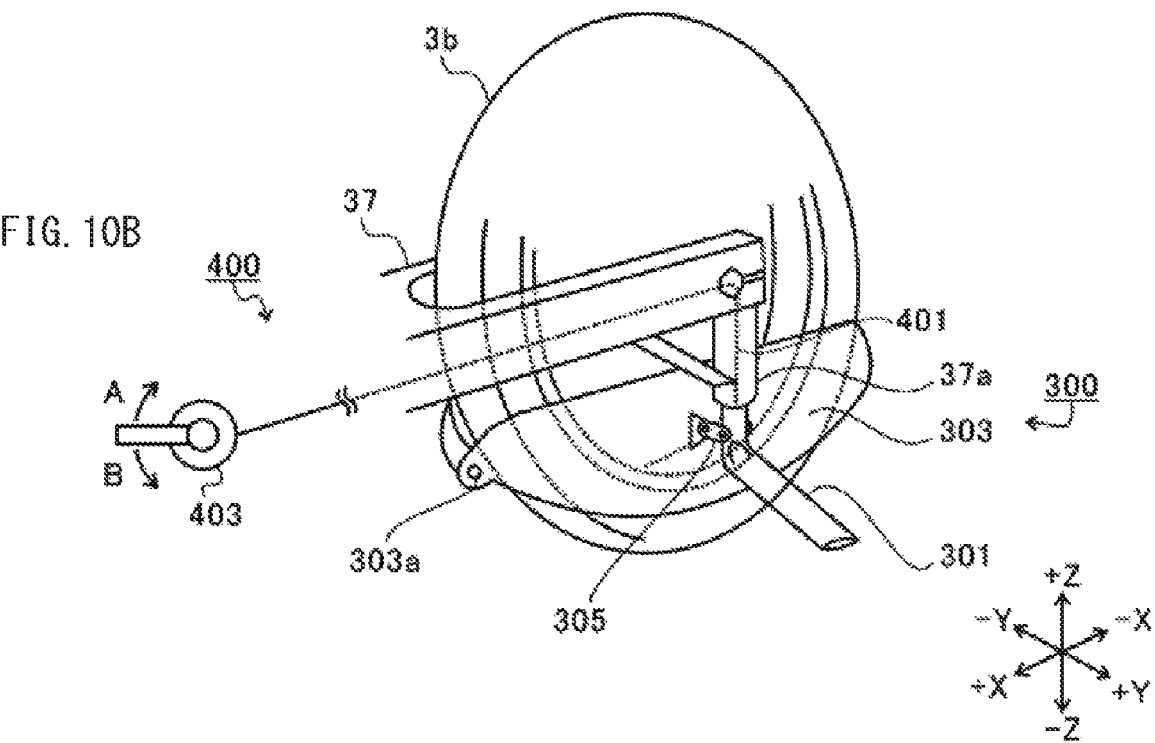

In the example embodiment, the vehicle 1 may include a wheel covering mechanism 300. FIGS. 10A and 10B are schematic views of a configuration of the wheel covering mechanism 300 provided in the vehicle 1. FIGS. 10A and 10B illustrate a configuration of the wheel covering mechanism 300 that is applied to the rear wheel 3b; a configuration of the wheel covering mechanism 300 that is applied to the front wheel 3a may be similar to the configuration illustrated in FIGS. 10A and 10B. FIG. 10A illustrates a state in which the rear wheel 3b is covered by the wheel covering mechanism 300, and FIG. 10B illustrates a state in which the rear wheel 3b is exposed from the wheel covering mechanism 300.

As illustrated in FIGS. 10A and 10B, the wheel covering mechanism 300 may include contactors 301, an under cowl 303, hinge units 305, and a fixing mechanism 400.

In one embodiment, the contactors 301 may serve as a "movable member". Each of the contactors 301 may have the form of a stick, for example. In the example embodiment, the contactor 301 may have a substantially L-like shape and may include metal. An upper part of the contactor 301 may be accommodated to be insertable and extractable in a tube 37a provided to extend from the swing arm 37. The contactor 301 may be slidable in the vertical direction Z with respect to the tube 37a. The contactors 301 may thus be provided to be movable in the vertical direction Z with respect to the body 7. The contactors 301 may protrude below a lower end of the wheel 3 to make lower ends of the contactors 301 come into contact with the ground. The contactors 301 may retract above the lower end of the wheel 3 to prevent the lower ends of the contactors 301 from coming into contact with the ground. The contactors 301 may serve as a ground detection contactor configured to detect a distance between the vehicle 1 and the ground.

In one embodiment, the under cowl 303 may serve as a "cover member". The under cowl 303 may cover at least a lower part of the rear wheel 3b. In the example embodiment, the under cowl 303 may be divided into two parts in the lateral direction Y. The two parts may be coupled to each other by a hinge 303a at an upper end in the upward direction +Z. The under cowl 303 may thus be configured to pivot, in the YZ plane, about the hinge 303a to open and close to the left and right. The under cowl 303 may protrude from the body 7 to cover the lower part of the rear wheel 3b in a closed state, and may be accommodated in the body 7 to expose the lower part of the rear wheel 3b in an open state.

The contactors 301 and the under cowl 303 may be coupled together by the hinge units 305. Each of the hinge units 305 may have one end coupled to the contactor 301 and the other end coupled to the under cowl 303. Vertical movement of the hinge 303a may be regulated, which causes the hinge units 305 to convert vertical movement of the contactors 301 into opening and closing of the under cowl 303. In other words, when the contactors 301 move in the upward direction +Z, the hinge units 305 may raise the respective left and right halves of the under cowl 303 in the upward direction +Z, causing the halves to pivot about the hinge 303a. Conversely, when the contactors 301 move in the downward direction -Z, the hinge units 305 may push down the halves of the under cowl 303 in the downward direction -Z.

The fixing mechanism 400 may include a wire 401 and a lever member 403. The wire 401 may include an outer casing and an inner wire inserted into the outer casing. The inner wire may be able to slide within the outer casing, while being guided by the outer casing.

The wire (inner wire) 401 may have one end coupled to the contactors 301 and the other end coupled to the lever member 403.

The lever member 403 may be configured to pivot about a pivot axis. The lever member 403 may be operable in an arrow A direction or an arrow B direction indicated in FIGS. 10A and 10B by the operator on board on the vehicle 1. Pivoting of the lever member 403 may cause the wire 401 to be reeled or unreeled. For example, if the lever member 403 pivots in the arrow A direction indicated in FIGS. 10A and 10B, the wire 401 may be unreeled to loosen. If the lever member 403 pivots in the arrow B direction indicated in FIGS. 10A and 10B, the wire 401 may be reeled to tighten. As with the lock mechanisms 200A and 200B described above, the wire 401 may be reeled or unreeled manually, or automatically by using an electric motor, for example.

If the wire 401 is reeled, the contactors 301 may be raised by the wire 401 to move in the upward direction +Z. The movement of the contactors 301 in the upward direction +Z may cause the under cowl 303 to move in the upward direction +Z via the hinge units 305. In other words, if the lever member 403 is caused to pivot in the arrow B direction indicated in FIGS. 10A and 10B, the under cowl 303 may transition from the closed state to the open state. The fixing mechanism 400 may additionally include an unillustrated regulating member configured to regulate pivoting of the lever member 403. The regulating member may be operated by the operator on board on the vehicle 1 to keep the under cowl 303 in the open state or the closed state. The regulating member may regulate pivoting of the lever member 403, which makes it possible to keep the contactors 301 in the raised state and keep the under cowl 303 in the open state.

Conversely, if the wire 401 is unreeled, the contactors 301 may be allowed to move in the downward direction -Z, thereby moving (falling) in the downward direction -Z due to self-weight. The movement of the contactors 301 in the downward direction -Z may cause the under cowl 303 to move in the downward direction -Z via the hinge units 305. In other words, if the lever member 403 is caused to pivot in the arrow A direction indicated in FIGS. 10A and 10B, the under cowl 303 may transition from the open state to the closed state. The fixing mechanism 400 may additionally include an unillustrated movement regulating member configured to regulate movement of the contactors 301 in the upward direction +Z. The movement regulating member may be provided to be operable by the operator on board on the vehicle 1. The movement regulating member may keep a state in which the contactors 301 have moved in the downward direction -Z, making it possible to keep the under cowl 303 in the closed state.

Figures 11A, 11B, 11C:
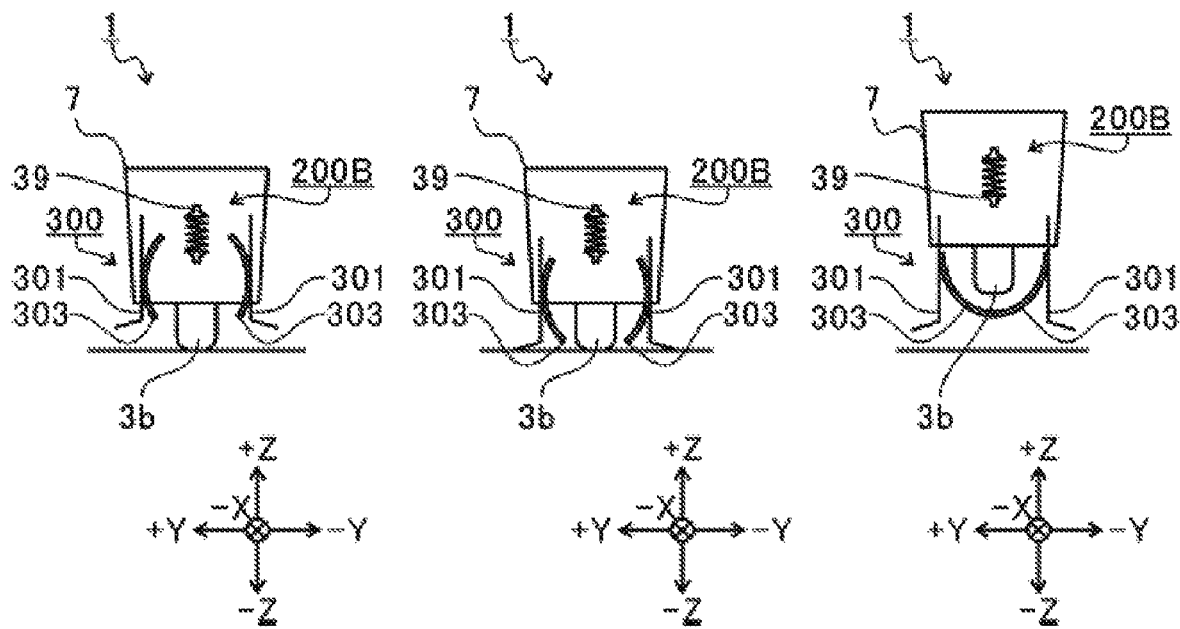
FIGS. 11A to 11F are schematic views of operation of the wheel covering mechanism.
Figures 11D, 11E, 11F:
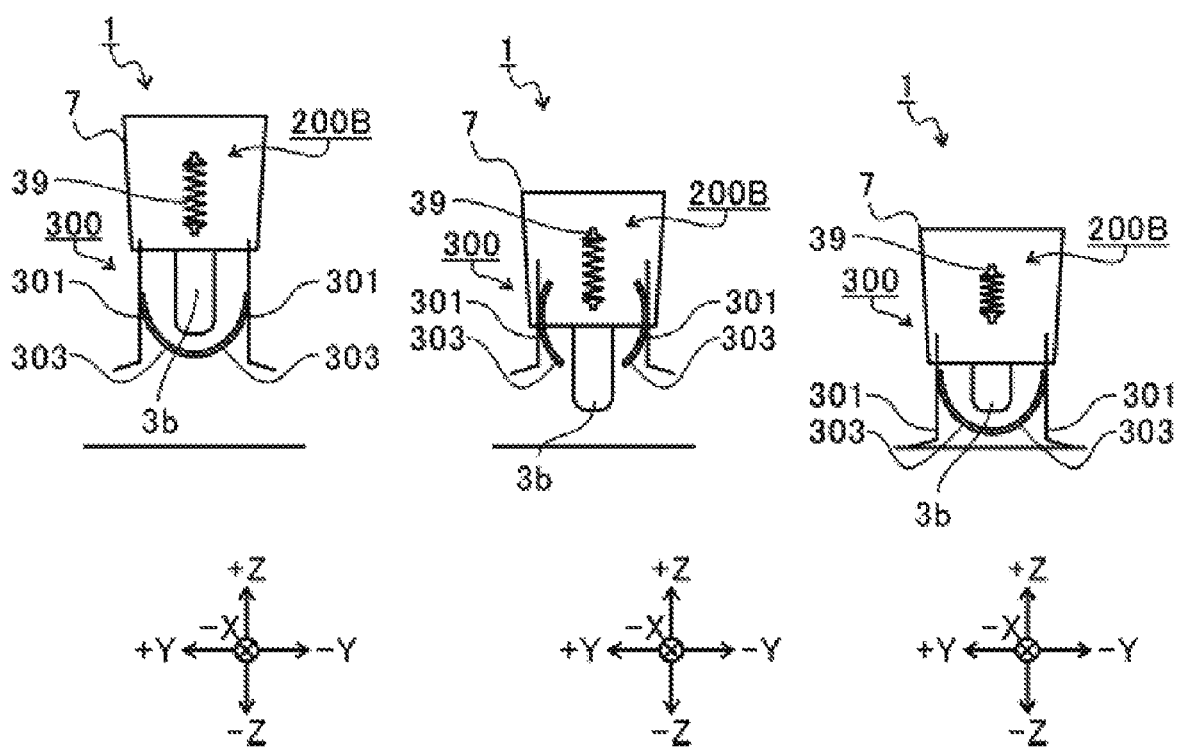

FIGS. 11A to 11F are schematic views of operation of the wheel covering mechanism 300. FIGS. 11A to 11F illustrate operation of the wheel covering mechanism 300 of the rear wheel 3b; operation of the wheel covering mechanism 300 of the front wheel 3a may be similar to that in FIGS. 11A to 11F. FIG. 11A illustrates a state in which the under cowl 303 is kept in the open state in the ground traveling mode. FIG. 11B illustrates a state in which the under cowl 303 is transitioning from the open state to the closed state before takeoff in the vertical takeoff-and-landing mode. FIG. 11C illustrates a state in which the under cowl 303 is kept in the closed state after takeoff in the vertical takeoff-and-landing mode. FIG. 11D illustrates a state in which the rear suspension 39 has been unlocked by the lock mechanism 200B before landing in the vertical takeoff-and-landing mode.

FIG. 11E illustrates a state in which, before landing in the vertical takeoff-and-landing mode, the under cowl 303 has transitioned from the closed state to the open state and is kept in the open state. FIG. 11F illustrates a state in which, at the time of landing in the vertical takeoff-and-landing mode, the contactors 301 have come into contact with the ground in place of the rear wheel 3b, and the vehicle 1 is supported by the contactors 301 to stand.

As illustrated in FIG. 11A, the rear suspension 39 may contract due to the self-weight of the vehicle 1 in the ground traveling mode. The lock mechanism 200B may be in a state of having unlocked the rear suspension 39, making the rear suspension 39 expandable and contractible. In other words, it is possible for the rear suspension 39 to reduce impact transmitted from the ground to the body 7 via the rear wheel 3b. The fixing mechanism 400 may keep the contactors 301 in the raised state, to bring the contactors 301 out of contact with the ground and keep the under cowl 303 in the open state. In FIG. 11A, the contactors 301 may be present at a retraction position above a lower end of the rear wheel 3b, and the fixing mechanism 400 may fix the contactors 301 to the retraction position. This enables the vehicle 1 to travel on the ground, while avoiding contact of the contactors 301 and the under cowl 303 with the ground. In one embodiment, the retraction position may serve as a "second position".

As illustrated in FIG. 11B, the rear suspension 39 may contract due to the self-weight of the vehicle 1 before takeoff in the vertical takeoff-and-landing mode. The operator may put the lock mechanism 200B into the lock state, thereby limiting the expansion of the rear suspension 39 from the contraction state, to lock the rear suspension 39 in the position where the rear suspension 39 has contracted due to the self-weight of the vehicle 1. The fixing mechanism 400 may be in a state of having unfixed the contactors 301, which allows movement of the contactors 301 in the vertical direction Z, making the contactors 301 vertically movable. The contactors 301 may thus move in the downward direction −Z due to self-weight to come into contact with the ground. The under cowl 303 may transition from the open state to the closed state with the downward movement of the contactors 301. In a state in which the contactors 301 are in contact with the ground, the under cowl 303 may keep being out of contact with the rear wheel 3b and the ground, without entering the closed state. In one embodiment, this state of "being out of contact with the rear wheel 3b and the ground" before entering the closed state may serve as a "semi-open state", and a position of the contactors 301 at this time may serve as an "intermediate position".

As illustrated in FIG. 11C, the contactors 301 may leave the ground after takeoff in the vertical takeoff-and-landing mode. The contactors 301 may thus protrude below the lower end of the rear wheel 3b. After the contactors 301 protrude to a position as low as possible, i.e., a protrusion position, tips of the contactors 301 may leave the ground. The contactors 301 may thus be vertically movable between the retraction position above the lower end of the wheel 3 and the protrusion position below the lower end of the wheel 3. The under cowl 303 may be provided to be openable and closable in conjunction with the vertical movement of the contactors 301. When the contactors 301 are present at the protrusion position, the under cowl 303 may enter the closed state to cover the lower part of the rear wheel 3b. At this time, the lock mechanism 200B may still be in the lock state, keeping the rear suspension 39 at the position where the rear suspension 39 has contracted due to the self-weight of the vehicle 1. The lower part of the rear wheel 3b may be covered by the under cowl 303, which makes it possible to reduce air resistance on the vehicle 1. In one embodiment, the protrusion position may serve as a "first position".

As illustrated in FIG. 11D, before landing in the vertical takeoff-and-landing mode, the operator may put the lock mechanism 200B into the unlock state to unlock the rear suspension 39. The rear suspension 39 may thus be released from a state of having contracted due to the self-weight of the vehicle 1, to expand in the downward direction −Z. With the expansion of the rear suspension 39, the rear wheel 3b may protrude in the downward direction −Z from the bottom surface 7a. The wheel covering mechanism 300 may move in the downward direction −Z together with the rear wheel 3b, causing the under cowl 303 to keep covering the lower part of the rear wheel 3b. In FIG. 11D, the contactors 301 may be out of contact with the ground.

As illustrated in FIG. 11E, before landing in the vertical takeoff-and-landing mode, the operator may operate the lever member 403 to raise the contactors 301 and the under cowl 303 in the upward direction +Z, exposing the rear wheel 3b. This may put the rear wheel 3b into a state of being able to come into contact with the ground. The lock mechanism 200B may have already been put into the unlock state. This enables the rear suspension 39 to reduce impact transmitted from the ground to the body 7 via the rear wheel 3b at the time of landing.

As illustrated in FIG. 11F, at the time of landing in the vertical takeoff-and-landing mode, the operator may operate the movement regulating member of the fixing mechanism 400 to regulate vertical movement of the contactors 301. In this case, at the time of landing, the contactors 301 may come into contact with the ground in place of the rear wheel 3b (the wheel 3). Landing of the vehicle 1 may be completed by the contactors 301 coming into contact with the ground in place of the wheel 3. Vertical movement, for example, movement in the upward direction +Z, of the contactors 301 may be regulated. This enables the contactors 301 to serve as a stand that supports the vehicle 1 on the ground, after coming into contact with the ground, i.e., after landing of the vehicle 1. The contactors 301 may make the vehicle 1 less likely to topple over, to keep the vehicle 1 in the standing state.

FIGS. 11A to 11F illustrate operation at the time of transition between the ground traveling mode and the vertical takeoff-and-landing mode; operation at the time of transition between the ground traveling mode and the horizontal flight mode may be similar to the operation in FIGS. 11A to 11F.

6. Example Workings and Effects

To reduce an increase in air resistance on an aircraft, a landing device provided in the aircraft is generally accommodated in a fuselage during aerial flight. An existing landing device accommodatable in a fuselage of an aircraft includes a shortening mechanism that shortens a total length of the landing device being accommodated. However, providing the shortening mechanism complicates a structure of the landing device, causing an increase in weight of the fuselage. The same applies to a land-and-air vehicle. To reduce air resistance during aerial flight, wheels of the land-and-air vehicle may be accommodated as much as possible in a fuselage. However, to stabilize traveling of the land-and-air vehicle on the ground, the wheels accommodated during aerial flight should be reliably deployed to the outside of the fuselage for ground traveling. For such a peculiar mobility, i.e., a land-and-air vehicle, no specific concept has been proposed about a technique of accommodating and deploying wheels. The aforementioned landing device assumes application to an aircraft, and the landing device including the shortening mechanism has a complicated device structure, which can cause an excessive increase in weight of the fuselage. The landing device is therefore not suitable for a relatively small land-and-air vehicle. It is desirable to reduce air resistance on a land-and-air vehicle during aerial flight, while achieving simplification and weight reduction of an accommodation mechanism that accommodates wheels of the land-and-air vehicle in a fuselage.

In view of such circumstances, in the example embodiment, the vehicle 1 includes the lock mechanisms 200A and 200B. The lock mechanism 200A limits the expansion of the front suspension 35 with the front suspension 35 having contracted due to the self-weight of the vehicle 1. The lock mechanism 200B limits the expansion of the rear suspension 39 with the rear suspension 39 having contracted due to the self-weight of the vehicle 1. This enables, during aerial flight of the vehicle 1, the lock mechanisms 200A and 200B to lock the suspensions 35 and 39 in the respective contraction positions. This locking makes it possible to limit the amount of protrusion L of the wheels 3 (the front wheel 3a and the rear wheel 3b) from the bottom surface 7a of the body 7. This enables the wheels 3 to be mostly accommodated in the body 7, making it possible to reduce air resistance on the vehicle 1 and improve fuel economy of the vehicle 1. In addition, the wheels 3 may be accommodated in the body 7 without use of a complicated mechanism and an actuator. This helps to achieve simplification and weight reduction of the accommodation mechanism for the wheels 3, resulting in weight reduction of the whole vehicle 1.

Before takeoff of the vehicle 1, the lock mechanisms 200A and 200B are put into the lock state to limit the expansion of the suspensions 35 and 39 that have contracted due to the self-weight of the vehicle 1. Before landing of the vehicle 1, the lock mechanisms 200A and 200B are put into the unlock state to unlock the suspensions 35 and 39, making the suspensions 35 and 39 expandable and contractible. This enables the lock mechanisms 200A and 200B to, after takeoff of the vehicle 1, reduce the amount of protrusion of the front wheel 3a and the rear wheel 3b from the bottom surface 7a of the body 7, reducing air resistance on the vehicle 1. In addition, it is possible for the suspensions 35 and 39 to reduce, at the time of landing of the vehicle 1, impact transmitted from the ground to the body 7 via the wheels 3 (the front wheel 3a and the rear wheel 3b).

The vehicle 1 may further include the wheel covering mechanism 300 including the contactors 301 and the under cowl 303. The contactors 301 may be provided to be vertically movable between the retraction position above the lower end of the wheel 3 and the protrusion position below the lower end of the wheel 3. The under cowl 303 may be provided to be openable and closable in conjunction with the vertical movement of the contactors 301. The under cowl 303 may cover the lower part of the wheel 3 in the closed state and expose the lower part of the wheel 3 in the open state. This enables the vehicle 1 to detect contact with the ground by the contactors 301 coming into contact with the ground, without using a sensor dedicated to detecting contact with the ground. In addition, such a configuration in which the under cowl 303 is able to operate in conjunction with the movement of the contactors 301 makes it possible to share a drive mechanism that drives the contactors 301 and the under cowl 303. This helps to simplify the configuration of the wheel covering mechanism 300. Driving the under cowl 303 in conjunction with the contactors 301 configured to detect contact with the ground makes it possible to avoid interference between the ground and the under cowl 303. This makes it less likely for durability of the under cowl 303 to decrease.

The vehicle 1 may further include the fixing mechanism 400. The fixing mechanism 400 may fix the contactors 301 to the retraction position or the protrusion position. Before takeoff of the vehicle 1, the fixing mechanism 400 may unfix the contactors 301 present at the retraction position, allowing the contactors 301 to move downward due to its self-weight. The under cowl 303 may enter the closed state in conjunction with the downward movement of the contactors 301 to cover the lower part of the wheel 3. This makes it possible to cause the under cowl 303 to transition from the open state to the closed state, without using an actuator that opens and closes the under cowl 303. This helps to reduce air resistance on the vehicle 1, and further promote simplification of a configuration and weight reduction.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the foregoing example embodiment, the vehicle 1 may be a vehicle based on a motorcycle including the two wheels 3, but the technology is not limited to this example. A land-and-air vehicle according to at least one embodiment of the technology may be a vehicle including three or more wheels, for example, a vehicle based on a four-wheeled vehicle including four wheels.

The invention claimed is:
1. A land-and-air vehicle configured to switch between a ground traveling mode and an aerial flight mode, the land-and-air vehicle comprising:
 a body;
 a wing attached to the body;
 a wheel provided on a lower side of the body;
 a suspension connecting the body and the wheel and configured to be expandable and contractible between a contraction position and an expansion position to which the suspension expands from the contraction position, the suspension contracting due to self-weight of the land-and-air vehicle in the ground traveling mode; and
 a first lock mechanism configured to lock expansion of the suspension from a state in which the suspension has contracted due to the self-weight,
 wherein the body covers the wheel and has an opening from which a part of the wheel protrudes downward both in the ground traveling mode and the aerial flight mode,
 wherein the land-and-air vehicle further comprises:
  a cover member configured to be closed to cover, and opened to uncover, the part of the wheel;
  a movable member coupled to the cover member; and
  a second lock mechanism configured to:
   lock the movable member to maintain the cover member to be opened so that the part of the wheel is uncovered; and
   unlock the movable member to allow the cover member to move downward due to self-weight of the cover member so that the cover member is closed to cover the part of the wheel;

wherein the movable member is configured to touch ground to prevent the cover member from touching the ground.

2. A land-and-air vehicle having a ground traveling mode, an aerial flight mode, a vertical takeoff mode, and a vertical landing mode, the land-and-air vehicle comprising:

a body;

a wind attached to the body;

a wheel provided on a lower side of the body, at least a lower part of the wheel being positioned outside the body in both the ground traveling mode and the aerial flight mode;

a suspension connecting the body and the wheel and configured to be expandable and contractible between a contraction position and an expansion position to which the suspension expands from the contraction position, the suspension contracting to contract due to self-weight of the land-and-air vehicle;

a first lock mechanism configured to lock the suspension to prevent expansion of the suspension;

a cover member configured to be closed to cover at least the lower part of the wheel, and to be opened to uncover the lower part of the wheel, the cover member having a curved shape along with a shape of the lower part of the wheel when the cover member covers the lower part of the wheel;

a movable member configured to move between a first position and a second position, the movable member being coupled to the cover member so that (1) when the movable member moves to the first position, the movable member causes the cover member to cover the lower part of the wheel, and (2) when the movable member moves to the second position, the movable member causes the cover member to uncover the lower part of the wheel, the movable member being configured to touch ground to prevent the cover member from touching the ground; and a second lock mechanism configured to lock the movable member.

3. A method comprising:

limiting the expansion of the suspension by putting the first lock mechanism into a lock state before takeoff of the land-and-air vehicle according to claim 2; and allowing the expansion of the suspension by putting the first lock mechanism into an unlock state before landing of the land-and-air vehicle.

4. The land-and-air vehicle according to claim 2, wherein, when the land-and-air vehicle is in the ground traveling mode, the first lock mechanism is configured to lock the suspension to prevent expansion of the suspension from a state in which the suspension has contracted due to the self-weight of the land-and-air vehicle, and wherein, when the land-and-air vehicle is in the ground traveling mode, the second lock mechanism is configured to lock the movable member at the second position to cause the cover member to uncover the lower part of the wheel.

5. The land-and-air vehicle according to claim 4, wherein, when the land-and-air vehicle is in a mode other than the ground traveling mode, the first lock mechanism is configured to unlock the suspension, and wherein, when the land-and-air vehicle is in a mode other that the ground traveling mode, the second lock mechanism is configured to unlock the movable member to allow the movable member to move downward to the first position due to self-weight of the movable member in order to cause the cover member to cover the lower part of the wheel.

6. The land-and-air vehicle according to claim 5, wherein after the ground traveling mode before the vertical takeoff mode, the movable member touches the ground before moving to the first position to cause the cover member to partially cover the lower part of the wheel.

7. The land-and-air vehicle according to claim 6, wherein after the land-and-air vehicle takes off the ground in the vertical takeoff mode, the movable member moves to the first position to cause the cover member to cover the lower part of the wheel.

8. The land-and-air vehicle according to claim 7, wherein when the movable member touches the ground during the vertical landing mode, the movable member moves toward the second position, in response to touching the ground, to cause the cover member to partially open so that the wheel touches the ground.

9. The land-and-air vehicle according to claim 7, wherein during the vertical landing mode, the second lock mechanism is configured to lock the movable member at the first position so that the land-and-air vehicle lands the ground using the movable member in place of the wheel.

* * * * *